(12) United States Patent
Taras et al.

(10) Patent No.: US 11,668,819 B1
(45) Date of Patent: Jun. 6, 2023

(54) SYSTEM AND METHOD FOR RAPID ACOUSTIC ASSESSMENT OF PIPE OBSTRUCTIONS

(71) Applicant: HYDRO-QUÉBEC, Montréal (CA)

(72) Inventors: André Roman Taras, Montréal (CA); Mathieu Soares, Montréal (CA)

(73) Assignee: HYDRO-QUÉBEC, Montréal (CA)

( * ) Notice: Subject to any disclaimer, the term of this patent is extended or adjusted under 35 U.S.C. 154(b) by 0 days.

(21) Appl. No.: 17/826,788

(22) Filed: May 27, 2022

(30) Foreign Application Priority Data

Mar. 22, 2022 (CA) .................................. CA 3152895

(51) Int. Cl.
*G01S 15/89* (2006.01)
*G01S 7/539* (2006.01)
*G01S 15/10* (2006.01)

(52) U.S. Cl.
CPC .............. *G01S 15/89* (2013.01); *G01S 7/539* (2013.01); *G01S 15/104* (2013.01)

(58) Field of Classification Search
CPC ........ G01S 15/89; G01S 7/539; G01S 15/104; H04B 3/52; H04B 3/54; H04B 3/56; H04B 3/36; H04B 2203/5441; H04B 3/58; H04B 2203/5483; H04B 2203/5479; H04B 7/04; H04B 3/46; H04B 5/0018; H04B 3/542; H04B 2203/5425; H04B 3/32; H04B 1/40; H04B 7/15507; H04B 3/00; H04B 10/40;

(Continued)

(56) References Cited

U.S. PATENT DOCUMENTS 10,768,017 B2 * 9/2020 Schmauder ............. B08B 9/047
10,928,513 B2 * 2/2021 Martin .................... G01S 15/34

(Continued)

FOREIGN PATENT DOCUMENTS

GB 2527208 A 12/2015

OTHER PUBLICATIONS

Wenbo On the use of power reflection ratio and phase change to determine the geometry of a blockage in a pipe, Jul. 25, 2014) (Year: 2014).*

(Continued)

*Primary Examiner* — Daniel L Murphy
*Assistant Examiner* — Amie M Ndure
(74) *Attorney, Agent, or Firm* — Fitch, Even, Tabin & Flannery LLP (57) ABSTRACT

A method for locating and quantifying obstructions in a pipe is described. The method comprises the steps of emitting at one end of the pipe, by means of a loudspeaker, an emitted signal comprising a wave train at a first frequency, the waves being of an acoustic type; receiving at the same end of the pipe, by means of a microphone, a reflected signal, resulting from the reflection of the wave train from obstructions in the pipe; determining a position of each of the obstructions according to a delay measured between the wave train of the emitted signal and the wave train of the reflected signal received by the microphone; and determining, for each of the obstructions, its degree of obstruction by extrapolating the energies of the emitted, reflected and transmitted signals. A system comprising the loudspeaker, the microphone, a processor, and a memory for performing the above method is also described.

20 Claims, 8 Drawing Sheets

(58) Field of Classification Search
CPC .............. H04B 3/50; H04B 7/0413; H04B 2203/5445; H04B 7/155; H04B 17/318; H04B 2203/5487; H04B 7/022; H04B 1/0475; H04B 7/024; H04B 1/00; H04B 1/38; H04B 5/0012; H04B 3/03; H04B 1/04; H04B 10/90; H04B 7/0617; H04B 7/15528; H04B 15/00; H04B 7/15; H04B 10/25752; H04B 3/38; H04B 3/04; H04B 1/0057; H04B 3/02; H04B 3/28; H04B 2203/5491; H04B 7/01; H04B 7/14; H04B 5/0075; H04B 2203/5495; H04B 3/06; H04B 2203/5466; H04B 1/7163; H04B 1/719; H04B 2203/5408; H04B 10/0799; H04B 10/25753; H04B 10/2581; H04B 3/544; H04B 7/15557; H04B 7/2606; H04B 5/005; H04B 10/25759; H04B 10/29; H04B 14/02; H04B 1/16; H04B 10/25; H04B 2203/5405; H04B 7/00; H04B 7/0613; H04B 7/145; H04B 17/17; H04B 17/0085; H04B 17/23; H04B 7/0417; H04B 7/2609; H04B 1/7174; H04B 5/0031; H04B 7/15592; H04B 1/005; H04B 15/02; H04B 3/546; H04B 5/0037; H04B 1/1027; H04B 1/71637; H04B 1/7176; H04B 10/1123; H04B 2203/5433; H04B 2203/5458; H04B 5/00; H04B 1/034; H04B 1/3805; H04B 10/807; H04B 13/00; H04B 17/27; H04B 17/309; H04B 2001/0491; H04B 3/48; H04B 7/0452; H04B 7/0608; H04B 7/0691; H04B 7/15542; H04B 1/02; H04B 1/10; H04B 17/101; H04B 2203/5416; H04B 3/21; H04B 7/0469; H04B 7/0495; H04B 7/0602; H04B 1/0466; H04B 1/1081; H04B 10/11; H04B 10/1129; H04B 10/114; H04B 17/102; H04B 17/103; H04B 17/336; H04B 2001/3811; H04B 3/548; H04B 7/0408; H04B 7/0831; H04B 1/0064; H04B 10/112; H04B 10/2575; H04B 10/50; H04B 10/60; H04B 17/24; H04B 17/382; H04B 17/3911; H04B 17/40; H04B 2203/5437; H04B 3/30; H04B 5/0062; H04B 7/066; H04B 7/0689; H04B 7/15535; H04B 7/15578; H04B 17/12; H04B 17/30; H04B 17/3913; H04B 17/408; H04B 7/18506; H04B 1/18; H04B 10/61; H04B 15/04; H04B 17/345; H04B 5/02; H04B 7/06; H04B 11/00; H04B 17/00; H01P 3/16; H01P 3/10; H01P 1/16; H01P 5/087; H01P 5/08; H01P 3/12; H01P 3/06; H01P 5/12; H01P 5/02; H01P 3/122; H01P 3/127; H01P 5/00; H01P 5/188; H01P 1/10; H01P 5/103; H01P 5/18; H01P 5/026; H01P 7/06; H01P 1/00; H01P 1/207; H01P 5/04; H01P 3/00; H01P 5/107; H01P 11/006; H01P 1/042; H01P 5/181; H01P 5/19; H01P 5/1022; H01P 7/08; H01P 1/182; H01P 1/22; H01P 5/085; H01P 3/08; H01P 11/002; H01P 3/165; H01P 1/02; H01P 1/04; H01P 1/225; H01P 5/024; H01P 1/064; H01P 1/222; H01P 1/068; H01P 1/30; H01P 1/2138; H01P 3/02; H01P 3/123; H01P 3/13; H01P 5/022; H01P 5/182; H01P 1/264; H01P 11/003; H01P 3/087; H01P 5/16; H01P 1/36; H01P 5/183; F16L 55/46; F16L 2101/12; F16L 2102/30; F16L 55/38; F16L 55/40; F16L 55/26; F16L 55/48; F16L 1/26; F16L 55/1283; F16L 55/28; F16L 2101/40; F16L 1/20; F16L 1/16; F16L 58/1009; F16L 1/12; F16L 55/136; F16L 55/44; F16L 55/32; F16L 55/18; F16L 1/203; F16L 1/166; F16L 13/0263; F16L 2101/70; F16L 2101/20; F16L 9/18; F16L 59/143; F16L 55/42; F16L 58/181; F16L 9/19; F16L 1/123; F16L 11/12; F16L 55/132; F16L 55/24; F16L 9/02; F16L 1/235; F16L 58/04; F16L 55/1645; F16L 58/1036; F16L 55/164; F16L 1/161; F16L 1/24; F16L 58/00; F16L 11/083; F16L 55/265; F16L 1/18; F16L 55/02772; F16L 57/06; F16L 58/08; F16L 1/19; F16L 2101/10; F16L 2101/16; F16L 53/34; F16L 55/128; F16L 57/02; F16L 41/021; F16L 2201/30; F16L 58/02; F16L 1/165; F16L 1/265; F16L 39/005; F16L 55/165; F16L 23/006; F16L 39/00; F16L 41/06; F16L 53/37; F16L 55/1652; F16L 1/207; F16L 41/03; F16L 55/1656; F16L 55/34; F16L 9/00; F16L 9/20; F16L 55/00; F16L 9/147; F16L 1/163; F16L 55/134; F16L 58/1027; F16L 1/00; F16L 23/02; F16L 37/002; F16L 41/023; F16L 53/00; F16L 53/32; F16L 58/10; F16L 11/16; F16L 13/02; F16L 55/07; F16L 55/10; F16L 55/162; F16L 11/133; F16L 21/02; F16L 25/01; F16L 29/00; F16L 37/35; F16L 39/06; F16L 41/004; F16L 55/11; F16L 55/16455; F16L 55/1655; F16L 58/1018; F16L 1/202; F16L 11/082; F16L 11/22; F16L 23/003; F16L 37/096; F16L 41/02; F16L 55/1003; F16L 55/16; F16L 55/1608; F16L 9/14; F16L 23/18; F16L 25/026; F16L 37/12; F16L 45/00; F16L 53/38; F16L 53/70; F16L 55/041; F16L 55/105; F16L 55/1654; F16L 55/30; F16L 57/00; F16L 59/153; F16L 27/125; F16L 37/248; F16L 37/34; F16L 59/20; F16L 1/036; F16L 1/06; F16L 11/20; F16L 2101/18; F16L 2201/44; F16L 47/03; F16L 55/1604; F16L 55/1612; F16L 58/1081; F16L 1/09; F16L 1/15; F16L 11/127; F16L 19/00; F16L 2101/60; F16L 25/14; F16L 3/00; F16L 37/122; F16L 41/008; F16L 47/04; F16L 47/24; F16L 55/1011; F16L 55/168; F16L 58/1054; F16L 19/0231; F16L 23/024; F16L 23/036; F16L 23/22; F16L 27/00; F16L 33/213; F16L 37/30; F16L 41/086; F16L 58/1045; F16L 59/14; F16L 9/16; F16L 1/206; F16L 11/08; F16L 11/15; F16L 13/04; F16L 19/0225; F16L 19/025; F16L 21/00; F16L 2101/50; F16L 2201/10; F16L 2201/40; F16L 23/20; F16L 25/065; F16L 33/00; F16L 33/006; F16L 33/24; F16L 37/36; F16L 37/367; F16L 37/373;

F16L 37/413; F16L 37/44; F16L 37/46;
F16L 37/62; F16L 41/04; F16L 47/20;
F16L 55/103; F16L 55/115; F16L 55/163;
F16L 58/184; F16L 58/187; F16L 59/00;
F16L 59/06; F16L 59/181; F16L 7/00;
F16L 1/0246; F16L 1/028; F16L 11/00;
F16L 11/14; F16L 15/002; F16L 15/004;
F16L 15/06; F16L 19/02; F16L 19/0206;
F16L 23/00; F16L 27/02; F16L 27/053;
F16L 41/028; F16L 41/16; F16L 53/30;
F16L 53/35; F16L 55/027; F16L 55/04;
F16L 58/14; F16L 58/18; F16L 59/028;
F16L 9/04; F16L 9/133; F16L 9/22; F16L
11/088; F16L 15/00; F16L 27/04; F16L
27/0824; F16L 3/1083; F16L 3/233; F16L
37/00; F16L 43/00; F16L 55/1651; F16L
55/1653; F16L 55/1658; F16L 55/36;
F16L 59/022; F16L 59/024; F16L 59/027;
F16L 59/065; F16L 59/07; F16L 59/12;
F16L 59/125; F16L 1/11; F16L 13/0236;
F16L 13/146; F16L 15/006; F16L
2011/047; F16L 23/026; F16L 23/032;
F16L 27/06; F16L 27/0861; F16L 3/08;
F16L 3/10; F16L 3/1066; F16L 3/12;
F16L 35/00; F16L 37/42; F16L 41/08;
F16L 41/082; F16L 41/14; F16L 43/001;
F16L 5/06; F16L 51/04; F16L 55/02718;
F16L 55/13; F16L 9/006; G01N
2291/2638; G01N 2291/2675; G01N
2291/269; G01N 2291/2696; G01N
23/204; G01N 23/22; G01N 23/2209;
G01N 23/222; G01N 2333/195; G01N
25/02; G01N 25/44; G01N 27/9046;
G01N 29/0609; G01N 29/226; G01N
29/2475; G01N 29/345; G01N 29/346;
G01N 29/40; G01N 3/068; G01N 3/56;
G01N 3/567; G01N 33/0098; G01N
33/025; G01N 33/38; G01N 33/56911;
G01N 33/56983; G01N 1/125; G01N
1/14; G01N 1/286; G01N 1/34; G01N
11/162; G01N 15/04; G01N 15/0618;
G01N 2001/105; G01N 2001/2866; G01N
2001/2873; G01N 2021/9542; G01N
2021/9548; G01N 21/532; G01N 21/94;
G01N 21/95; G01N 2201/129; G01N
2203/0017; G01N 2203/0073; G01N
2203/0264; G01N 2203/0617; G01N
2203/0623; G01N 2203/0658; G01N
2203/0682; G01N 2291/022; G01N
2291/02491; G01N 2291/2672; G01N
27/221; G01N 27/223; G01N 27/225;
G01N 27/725; G01N 27/90; G01N
27/9026; G01N 27/906; G01N 27/9073;
G01N 29/0654; G01N 29/09; G01N
29/227; G01N 29/2493; G01N 3/02;
G01N 3/32; G01N 33/0004; G01N
33/2811; G01N 33/2841; G01N 5/02;
H01Q 13/24; H01Q 13/02; H01Q 19/08;
H01Q 1/46; H01Q 21/205; H01Q 9/0485;
H01Q 13/06; H01Q 1/50; H01Q 1/246;
H01Q 21/064; H01Q 13/08; H01Q
1/2291; H01Q 19/062; H01Q 3/26; H01Q
3/08; H01Q 13/26; H01Q 21/20; H01Q
13/28; H01Q 15/08; H01Q 15/14; H01Q
3/24; H01Q 1/38; H01Q 13/20; H01Q
3/30; H01Q 3/36; H01Q 21/29; H01Q
1/36; H01Q 21/067; H01Q 13/025; H01Q
21/00; H01Q 1/12; H01Q 15/24; H01Q
25/007; H01Q 25/04; H01Q 13/0208;
H01Q 1/24; H01Q 1/40; H01Q 13/10;
H01Q 1/1228; H01Q 15/02; H01Q 3/245;
H01Q 3/40; H01Q 1/44; H01Q 13/106;
H01Q 17/00; H01Q 25/00; H01Q 1/1207;
H01Q 1/422; H01Q 21/0006; H01Q
21/06; H01Q 21/28; H01Q 5/30; H01Q
13/0233; H01Q 13/22; H01Q 21/065;
H01Q 21/22; H01Q 25/002; H01Q 3/22;
H01Q 3/247; H01Q 3/34; H01Q 15/16;
H01Q 15/242; H01Q 23/00; H01Q 1/20;
H01Q 1/48; H01Q 13/203; H01Q 15/12;
H01Q 19/09; H01Q 21/0068; H01Q 3/00;
H01Q 1/125; H01Q 1/528; H01Q
13/0241; H01Q 15/244; H01Q 3/12;
H01Q 3/2605; H01Q 5/10; H01Q 5/22;
H01Q 5/55; H01Q 1/1242; H01Q
13/0258; H01Q 19/18; H01Q 1/04; H01Q
1/22; H01Q 1/42; H01Q 19/19; H01Q
19/193; H01Q 19/22; H01Q 19/28; H01Q
3/18; H01Q 3/242; H01Q 3/2658; H01Q
9/04; H01Q 9/285; H01Q 1/28; H01Q
1/288; H01Q 13/103; H01Q 19/06; H01Q
19/108; H01Q 19/132; H01Q 19/17;
H01Q 19/185; H01Q 21/061; H01Q
21/068; H01Q 3/10; H01Q 3/46; H01Q
7/08; H01Q 1/02; H01Q 1/18; H01Q
1/243; H01Q 1/52; H01Q 1/525; H01Q
11/08; H01Q 11/083; H01Q 13/085;
H01Q 13/18; H01Q 21/0056; H01Q
21/08; H01Q 21/24; H01Q 9/30; H01Q
1/088; H01Q 1/103; H01Q 1/1257; H01Q
1/2225; H01Q 13/0266; H01Q 13/0275;
H01Q 15/0093; H01Q 21/0043; H01Q
21/0087; H01Q 3/38; H01Q 5/47; H01Q
7/00; H01Q 9/0407; H01Q 9/0442; H01Q
9/045; H01Q 19/13; C10G 75/00; C10G
9/16; C10G 75/04; C10G 35/04; C10G
9/005; C10G 9/203; C10G 75/02; C10G
2300/4075; C10G 9/12; C10G 35/24;
C10G 1/00; C10G 2300/205; C10G
2400/02; C10G 2400/04; C10G 2400/08;
C10G 31/06; C10G 73/00; C10G 9/007;
C10G 1/02; C10G 1/045; C10G
2300/1033; C10G 2300/107; C10G
2300/1077; C10G 2300/302; C10G 29/06;
C10G 29/20; C10G 29/22; C10G 9/00;
C10G 9/32; C10G 21/08; C10G
2300/1011; C10G 31/00; C10G 1/008;
C10G 9/20; C10G 21/14; C10G
2300/4012; C10G 33/04; C10G 53/04;
C10G 21/00; C10G 2300/201; C10G
2300/805; C10G 29/02; C10G 29/205;
C10G 32/02; C10G 53/08; C10G 1/04;
C10G 1/047; C10G 2300/308; C10G
2300/802; C10G 29/10; C10G 29/16;
C10G 31/09; C10G 29/00; C10G 31/08;
C10G 70/004; C10G 9/206; C10G 1/042;
C10G 2/32; C10G 2300/1081; C10G
2300/202; C10G 2300/4006; C10G

2400/20; C10G 29/28; C10G 31/10;
C10G 32/00; C10G 35/095
See application file for complete search history.

(56) References Cited

U.S. PATENT DOCUMENTS

2002/0035437 A1   3/2002   Tingley
2006/0287596 A1*  12/2006  Johnson ............... A61B 8/0825
                                                600/437
2015/0362465 A1   12/2015  Martin et al.

OTHER PUBLICATIONS

Xuesong Wang et al., "Detection of hydrate and other blockages in gas pipelines using acoustic reflectometry," Proc IMechE Part C: J Mechanical Engineering Science 226(7) pp. 1800-1810 @MechE, 2011.

José L. A,Vidal, et al., "Acoustic Reflectometry for Blockage Detection in Pipeline," XX Congresso Brasileiro de Automatica, pp. 3916-3923, 2014.

Zao Feng et al., "An acoustic method for condition classification of a water-filled underground siphon," Advances in Mechanical Engineering, pp. 1-12, vol. 11(4), 2019.

M. T. Bin Ali et al., "Rapid detection of sewer defects and blockages using acoustic-based instrumentation," Water Science & Technology; pp. 1700-1707; 64.8; 2011.

K A Papadopoulou et al., "An evaluation of acoustic reflectometry for leakage and blockage detection," Proc. IMechE Part C: J. Mechanical Engineering Science, pp. 959-966; vol. 222; 2008.

M. Harrington et al., "Integrated monitoring system for drains and other tubular structures," Transport Research Laboratory, Report PPR630, 2012.

Louati et al., "Eigenfrequency Shift Mechanism due to an Interior Blockage in a Pipe," Journal Hydraulic Eng. ASCE, 2017.

Nan BU et al., "Blockage Detection in Pipelines Using a Flexible Piezoelectric Film Sensor," SICE Journal of Control, Measurement, and System Integration, vol. 3, No. 1, pp. 059-065, Jan. 2010.

Liwen Jing et al., "Channel Characterization of Acoustic Waveguides Consisting of Straight Gas and Water Pipelines," Hong Kong Research Grants Council, Grant T21-602/15R, pp. 6807-6819; 2018.

Gildas Besancon et al., "Pipeline partial blockage modeling and identification," 11th IFAC International Workshop on Adaptation and Learning in Control and Signal Processing, Jul. 3-5, pp. 730-735; 2013. Caen, France.

Ying Xu et al., "Research of Blockage Segment Detection in Water Supply Pipeline Based on Fluid Transient Analysis," 1st International WDSA / CCWI 2018 Joint Conference, Kingston, Ontario, Canada—Jul. 23-25, 2018.

Mateusz Kosior, "The Concept of an Improved Acoustic Wireless Sensor Node for Leak Detection and Location in a Water Distribution Network," Diagnostyka, vol. 20, No. 4, pp. 1-7, 2019.

Vernon Marc Erasmus, "Methods of Pipe and Leak Detection in Underground Water and Sewer Reticulations," Thesis University of Pretoria, 2009.

Xun Wang et al., "Matched-Field Processing Method for Leak Detection in a Pipe," E-proceedings of the 37th IAHR World Congress; HAL Id:hal-01576490, Sep. 10, 2017.

N F Adnan et al., "Leak detection in gas pipeline by acoustic and signal processing," 3rd International Conference of Mechanical Engineering Research (ICMER 2015).

Mohd Shahrul Azmi Mohamad Yusoff, "Defect Detection in Pipeline Using Acoustic Pulse Reflectometry," Phd Thesis, The University of Manchester, 2019.

* cited by examiner

SYSTEM AND METHOD FOR RAPID ACOUSTIC ASSESSMENT OF PIPE OBSTRUCTIONS

CROSS-REFERENCE TO RELATED APPLICATION

This application is based upon and claims the benefit of priority from the prior Canadian Patent Application No. 3152895, filed on Mar. 22, 2022, the entire contents of which are incorporated herein by reference.

TECHNICAL FIELD

The technical field of the invention relates to a system and method for detecting obstructions in pipes. More specifically, the invention describes a system for transmitting and receiving acoustic waves to determine the position, quantity, and extent of obstructions in pipes, such as hydroelectric dam drains.

STATE OF THE ART

Pipes filled with air, gas, or liquid may over time become clogged with deposits, such as calcite deposits. For example, hydroelectric dam structures may include drains to provide dam drainage. For proper operation, these pipes or drains must be cleaned regularly. It is therefore necessary to determine the positions and degree of obstructions along the drains. The common method currently used is to inspect each drain with a camera, analyze the images and then determine the obstructions along the drain. However, this method is tedious and time consuming.

There is a need for a faster method that achieves similar results as camera-based inspection, i.e., detection of the number of obstructions, their respective positions, and the extent of the obstructions in the pipes.

SUMMARY

According to a first aspect, a method for locating and quantifying obstructions in a pipe is described. The method comprises emitting, at an end of the pipe, through a loudspeaker, an emitted signal comprising a wave train, the waves being of an acoustic type; receiving at the same end of the pipe, through a microphone, a reflected signal resulting from a reflection of the wave train on the obstructions in the pipe; determining a position of each of the obstructions based on a time delay measured between the wave train of the emitted signal and the wave train of the reflected signal received by the microphone.

The method also includes determining, for a most upstream obstruction, its degree of obstruction by performing the steps of:
a) extrapolating an energy of the emitted signal and an energy of the reflected signal at the position of the obstruction;
b) calculating a reflection coefficient $C_D=E_r/E_i$, where $E_i$ is the extrapolated emitted signal energy and $E_r$ is the extrapolated reflected signal energy;
c) calculating a ratio a/A of a partly obstructed section and a complete section of the pipe, the ratio a/A being determined by a function of the reflection coefficient $C_D$.

Finally, the method comprises determining, for subsequent obstructions, their respective degrees of obstruction by repeating steps a) through c) for each one, and by replacing the extrapolated emitted signal energy $E_i$ with a transmitted energy $E_t$ once the upstream obstruction has been passed.

According to one possible embodiment, the step of emitting the emitted signal comprises a step of forming the wave train with a number n of cycles, where $n \geq 3$.

According to one possible embodiment, the method comprises a step of determining a number of close proximity obstructions m by estimating, from the reflected signal, a number of overlapped cycles $n_t$ greater than the number of emitted cycles n in the wave train, such that m is a rounded-up integer of the ratio $(n_t/n)$.

According to one possible embodiment, the wave train is a first wave train emitted at a first frequency, the first frequency corresponding approximately to a first wavelength of 3 times the diameter of the pipe.

According to another possible embodiment, the emitted signal comprises a second wave train at a second frequency corresponding approximately to a second wavelength of 10 times the diameter of the pipe, wherein the first and second wave trains permitting to detect different types of obstructions. The method also includes a step of corroborating the respective position of the obstructions and their degrees of obstruction using the results obtained with the first and second wave trains.

According to a further possible embodiment, the reflected signal comprises a first signal reflected from the obstructions of the pipe, downstream of the microphone, and a second signal reflected from the loudspeaker, upstream of the microphone, the method comprising a step of eliminating the second signal reflected by emitting through the loudspeaker, a wave train equal to but in opposite phase with the second signal reflected from the loudspeaker.

According to one possible embodiment, the function that determines the ratio a/A with respect to the reflection coefficient $C_D$ is given by $a/A = P_1 \times C_D + P_2$, $P_1$ being a first constant between 0.1 and 2 and $P_2$ being a second constant between -1 and 1, according to the frequency used.

According to one possible embodiment, $P_1$ is equal to 1 and $P_2$ is equal to 0.

According to another possible embodiment, the transmitted energy $E_t$ corresponds to the extrapolated emitted signal energy $E_i$ multiplied by $[1-C_D^{C_{trans}}]$, where $C_{trans}$ is a transmissibility coefficient having a value between 1 and 6, based on a detected element.

According to one possible embodiment, the value of $C_{trans}$ is equal to 2.55 when the detected element is a distinct obstruction.

According to another possible embodiment, the value of $C_{trans}$ is equal to 1 when the detected element is a close proximity obstruction.

According to a further possible embodiment, the value of $C_{trans}$ is equal to 6 when the detected element is a cavity.

According to yet another possible embodiment, the step of extrapolating comprises a step of applying an attenuation factor on the emitted and reflected signals, based on a distance of a given obstruction from the end of the pipe.

According to a possible embodiment, the method includes a step of simulating a complete blockage of the pipe at a predetermined distance from the end of the pipe, to determine the attenuation factor to be applied in the step of extrapolating the emitted signal and the reflected signal to the position of the obstructions.

According to one possible embodiment, the method includes a step of detecting a cavity in the pipe by identifying, in the reflected signal, a wave train in anti-phase relative to the wave train of the emitted signal.

According to a possible embodiment, the method comprises a step of identifying a bend in the pipe when the microphone receives the reflected signal of the first wave train but does not receive the reflected signal of the second wave train.

According to a second aspect, a portable system for locating and quantifying obstructions in a pipe is described. The system comprises a loudspeaker, configured to emit at an end of the pipe an emitted signal comprising a wave train, the waves being of an acoustic type; a microphone, configured to receive, at the same end of the pipe, a reflected signal, resulting from a reflection of the wave train on the obstructions in the pipe; a processor and a memory in communication with the processor, the processor and the memory being operatively connected to the microphone and the loudspeaker.

The memory comprises instructions executable by the processor to determine a position of each of the obstructions based on a measured time delay between the emitted signal wave train and the reflected signal wave train received by the microphone; and determine, for the most upstream obstruction, its degree of obstruction by performing the steps of:
a) extrapolating an emitted signal energy and a reflected signal energy at the position of the obstruction;
b) calculating a reflection coefficient $C_D=E_r/E_i$, where $E_i$ is the extrapolated emitted signal energy and $E_r$ is the extrapolated reflected signal energy; and
c) calculating a ratio a/A between a partly obstructed section and a complete section of the pipe, the ratio a/A being determined by a function of the reflection coefficient $C_D$.

The processor is also able to determine, for subsequent obstructions, their respective degree of obstruction by repeating steps a) to c) for each one and by replacing the extrapolated emitted signal energy $E_i$ with a transmitted energy $E_t$ once the upstream obstruction has been passed.

According to one possible embodiment, the loudspeaker and the microphone are disposed in a housing, and the processor and the memory are offset from the housing.

According to one possible embodiment, the housing is positioned at the end of the pipe, with the loudspeaker and microphone aligned on a central axis of the pipe.

According to another possible embodiment, the loudspeaker is located approximately 3 cm upstream of the microphone relative to the end of the pipe.

According to a further possible embodiment, the emitted signal is formed of the wave train with a number n of cycles, where n≥3.

According to a possible embodiment, the processor is adapted to determine a number of close proximity obstructions m by estimating, from the reflected signal, a number of overlapped cycles $n_t$ greater than the number of emitted cycles n in the wave train, such that m is a rounded-up integer of the ratio ($n_t/n$).

According to one possible embodiment, the wave train is a first wave train emitted at a first frequency, the first frequency corresponding approximately to a first wavelength of 3 times the diameter of the pipe.

According to another possible embodiment, the emitted signal comprises a second wave train at a second frequency corresponding approximately to a second wavelength of 10 times the diameter of the pipe, the first and second wave trains for detecting obstructions of different types; the processor being able to corroborate the position of the obstructions and their degree of obstruction with the results obtained with the first and second wave trains.

According to a further possible embodiment, the reflected signal comprises a first signal reflected from the pipe obstructions downstream of the microphone and a second signal reflected from the loudspeaker upstream of the microphone, the processor being adapted to eliminate the second reflected signal by controlling the loudspeaker to emit a wave train equal to but in anti-phase with the second signal reflected from the loudspeaker.

According to one possible embodiment, the function that determines the ratio a/A with respect to the reflection coefficient $C_D$ is given by $a/A=P_1 \times C_D+P_2$, $P_1$ being a first constant between 0.1 and 2 and $P_2$ being a second constant between −1 and 1, depending on the frequency used.

According to a possible embodiment, $P_1$ is equal to 1 and $P_2$ is equal to 0.

According to another possible embodiment, the transmitted energy $E_t$ corresponds to the extrapolated emitted signal energy $E_i$ multiplied by $[1-C_D^{C_{trans}}]$, where $C_{trans}$ is a transmissibility coefficient with a value between 1 and 6, depending on a detected element.

According to one possible embodiment, the value of $C_{trans}$ is equal to 2.55 when the detected element is a distinct obstruction.

According to another possible embodiment, the value of $C_{trans}$ is equal to 1 when the detected element is a close proximity obstruction.

According to a further possible embodiment, the value of $C_{trans}$ is equal to 6 when the detected element is a cavity.

According to one possible embodiment, the step of extrapolating comprises a step of applying an attenuation factor to the emitted and reflected signals as a function of the distance from the end of the pipe.

Other objects, advantages, aspects and features of the invention will become clearer and better understood in view of the non-limiting description of the invention, and through the figures present in the application.

BRIEF DESCRIPTION OF THE DRAWINGS

A detailed description of the invention will be given below with reference to the following drawings.

DETAILED DESCRIPTION

In the description and figures that follow, the same reference numbers refer to similar elements of the invention. Further, in order not to unduly clutter the figures, it is possible that a figure may not contain all of the reference numbers of the elements therein. Thus, it is also possible that certain elements or components are referenced in only one figure. The elements thus referenced can be easily inferred in the other figures presented. The embodiments, geometric configurations, materials and/or dimensions shown in the figures or described in the present disclosure are only indicative, and show possible embodiments, presented as examples, and should not be construed as limitations of the invention.

Figure 1:
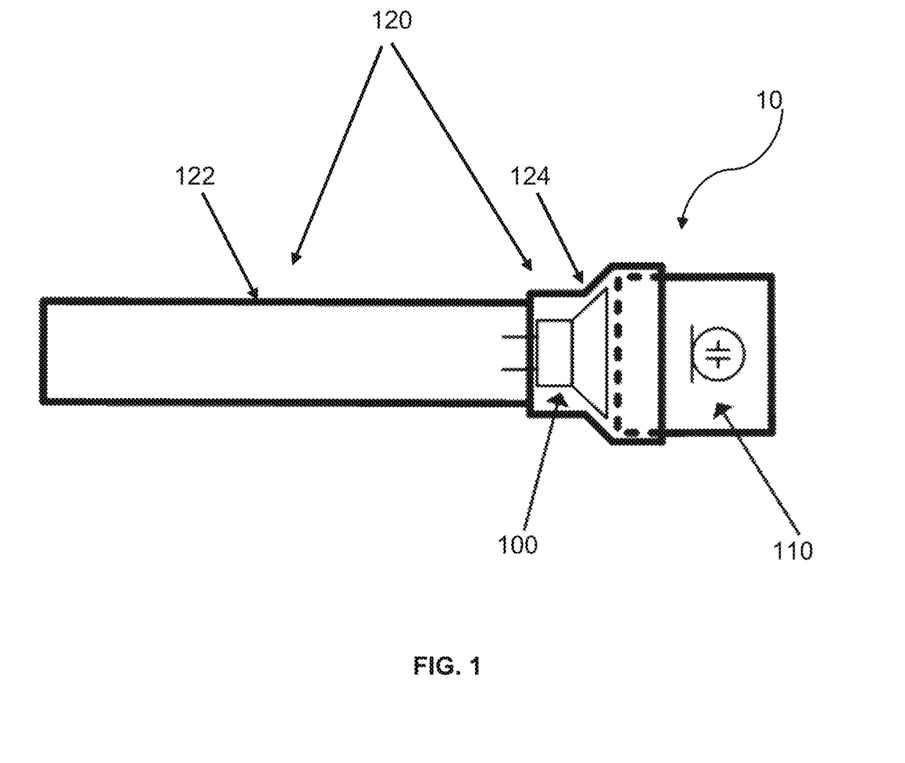
FIG. 1 is a cross-section of the portable system for locating and quantifying obstructions in a pipe, comprising a loudspeaker and a microphone, according to one embodiment.

Referring to FIG. 1, a portable system 10 for locating and quantifying obstructions in a pipe is shown. The portable system 10 can be adapted for different types of pipes, filled with a homogeneous medium, such as air or water. In the embodiments shown below, the portable system is particularly suitable for locating and quantifying the degree of obstruction in concrete drains, to drain water from hydroelectric dams. At the time of the inspection of the drains by this system, the water has been evacuated through the drains, and the drains contain air. The obstructions include clumps of calcite deposits attached to the inner wall of the drains.

The system 10 includes means for emitting signals, such as a loudspeaker 100 and means for receiving signals, such as a microphone 110. The loudspeaker 100 is configured to emit an emitted signal comprising a wave train, or a train of waves, the waves being of an acoustic type. The loudspeaker used may be a miniature loudspeaker, resistant to outdoor use thanks to moisture protection properties. It can also be used in a range of outdoor temperatures, for example between −40° C. and +80° C. According to one possible embodiment, the loudspeaker is dimensioned so that its cone or the circumference of its membrane is equal to or smaller than the diameter of the pipe to be inspected.

The microphone 110 is configured to receive a reflected signal, resulting from the reflection of the wave train emitted by the loudspeaker on the obstructions in the pipe. The microphone used may be of the low noise, pre-polarized measurement microphone type. In some cases, the microphone may contain a built-in preamplifier. The microphone is also preferably sized so that it can be inserted, in whole or in part, at the end of the pipe where the loudspeaker is located.

Figure 2:
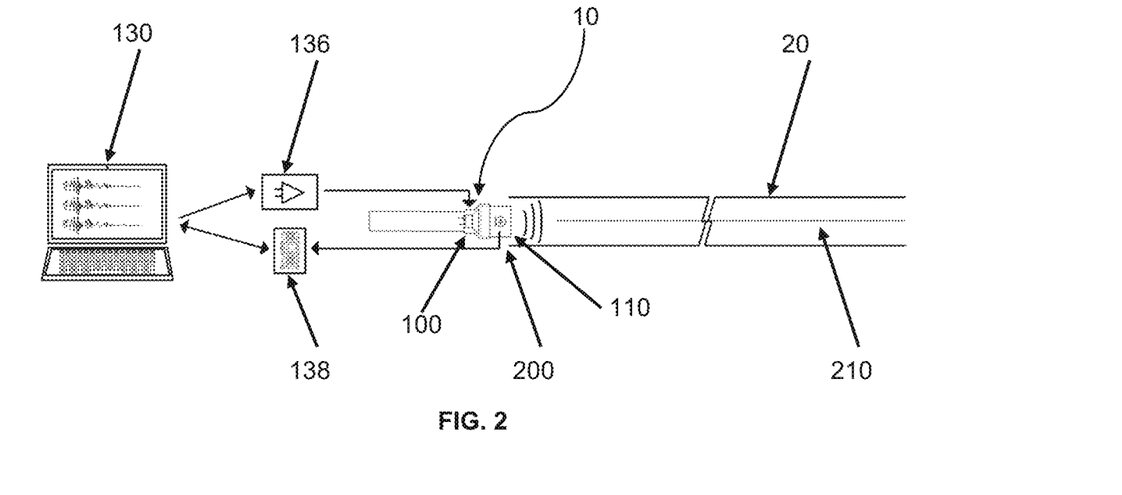
FIG. 2 is a schematic view of the system of FIG. 1, connected to a computer via a signal acquisition board and an audio amplifier, and positioned at a proximal end of the pipe, according to one embodiment.

FIG. 2 illustrates the operational connection between the loudspeaker 100, the microphone 110, and a computer 130. The computer 130 comprises at least a processor and a memory, the memory comprising instructions executable by the processor. The computer 130, through an audio card of the computer, can generate the emitted signal. A software application, such as Labview®, may be used to generate the emitted signal comprising an n-cycle acoustic plane wave train at a given frequency. The output signal from the computer's audio card can then be sent to an audio amplifier 136 for amplification. Once amplified, the emitted signal is then propagated through the loudspeaker 100. The portable system 10, positioned at a proximal end 200 of the pipe 20, thus causes the emitted signal to be propagated through the pipe. The emitted signal propagating through the pipe is partly reflected and partly transmitted when it encounters a partially obstructed section. A reflected signal returns from the obstructions at different distances and is recorded by the microphone 110 with a respective delay or time lag associated with each obstruction. The reflected signal is identified by an acoustic pulse consisting of a wave train. The reflected signal measured by the microphone 110 is then transmitted to a signal acquisition card 138, and finally transmitted to the computer 130. The computer can host SimCenter TestLab® type acquisition software to analyze the emitted and reflected signals.

The emitted signal as well as the reflected signal are digitized by the acquisition software. The signals are recorded at a sampling rate, for example 51.2 kHz. The data can be recorded and stored in the computer memory 130 for analysis. According to one possible embodiment, the analyzed signals may correspond to the result of a given number of time averages, for example 5 time averages, synchronized from the signal transmitted via the audio card. The purpose of the time averages is to denoise the signal measured by the microphone.

In one embodiment, the loudspeaker 100 and microphone 110 may be inserted into a housing 112. This housing 112 may be made of PVC, rubber, plastic, or any relatively rigid material. The housing allows the loudspeaker 100 and microphone 110 to be held in an aligned position at a given distance from each other. In one possible embodiment, the distance between the loudspeaker and the microphone is between 1 and 10 cm, and preferably about 3 cm. In one embodiment, the housing may comprise a PVC tube 122 about 5 cm in diameter and 30 cm in length, and a rubber adapter 124 attached to the tube 122, the adapter 124 having an enlarged diameter relative to the tube 122, so as to exactly match the diameter of the pipe 20. The tube 122 allows for better handling and grip of the portable system 10. In use, the portable system 10 is positioned at a proximal end 200 of the pipe 20, such that the loudspeaker 100 and microphone 110 are aligned with the centerline 210 of the pipe. The configuration of the housing is for illustrative purposes only, and other configurations are possible. The housing may allow for increased portability of the system, so that the system can be easily and quickly installed and uninstalled at the proximal end of the pipe to be inspected.

Figure 3:
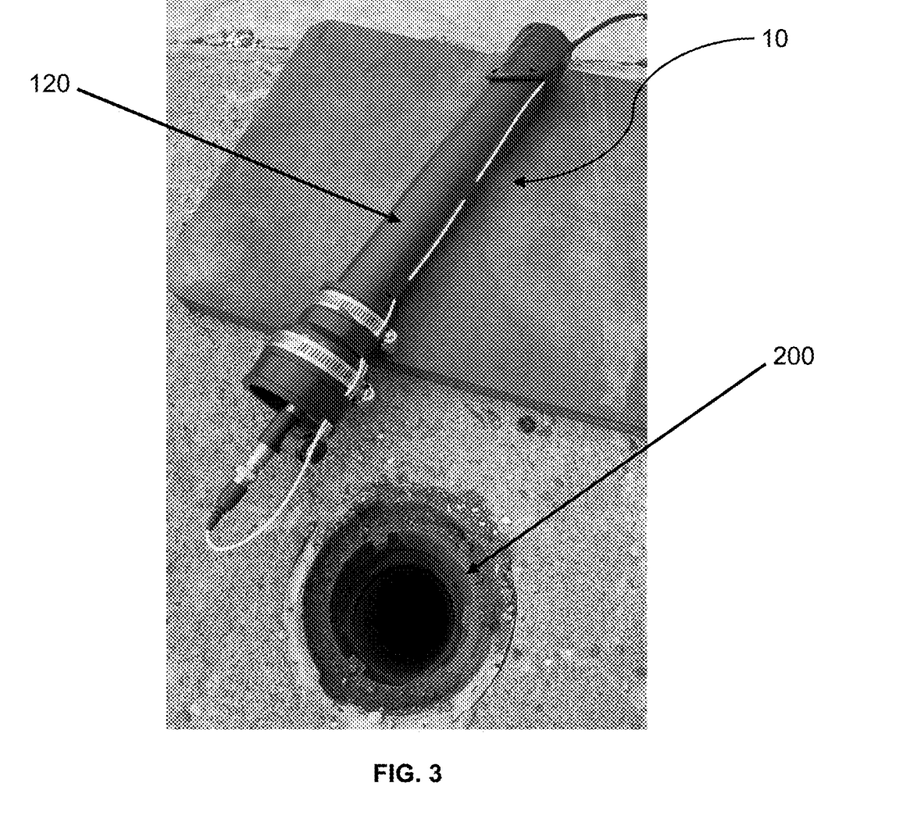
FIG. 3 is a photograph of the system shown in FIG. 2, with the system positioned adjacent to the pipe, with the pipe being a barrier drain, according to one embodiment.

FIG. 3 shows the housing 120 of the system 10 as well as connection cables for operational connection between the microphone, loudspeaker and computer, with the housing 120 positioned adjacent to the proximal end 200 of the pipe 20 to be inspected. In this embodiment, the pipe to be inspected is a dam crest drain, the walls of which are made of concrete.

FIGS. 4A to 10 illustrate in more detail the method for locating and quantifying obstructions in a pipe filled with a homogeneous medium or mediums, such as a dam drain, with the portable system 10. By "homogeneous medium" is meant a medium whose acoustic wave propagation characteristic have substantially the same properties at any point. For example, a pipe filled with water, air, gas or any other oleochemical liquid would be considered a homogeneous medium. Although the theoretical principle of the method described below is similar in any homogeneous medium, the embodiment described below and the values of the constants determined correspond to the homogeneous medium of air, and the pipe is a hydroelectric dam drain, made of concrete or PVC, having a diameter preferably between 5 and 20 cm, and generally around 10 cm.

The method involves emitting an acoustic signal comprising at least a number of cycles n at a frequency f. The frequency f is determined by the ratio of a propagation speed V of the wave in the homogeneous medium determined by a wavelength λ of the signal.

$$f = \frac{V}{\lambda}$$

In the illustrated embodiment, the homogeneous medium in which the signal propagates is air, for which the propagation speed V of the wave is equal to 340 m/s. The wavelength λ is determined with respect to the diameter d of the pipe. In order to ensure that the wave propagating inside the pipe is relatively flat, i.e., a wave whose wave fronts are relatively perpendicular to a direction of wave propagation, its wavelength λ must be at least 2 times the diameter d of the pipe.

In order to apply the developed models for predicting the degree of obstruction, two frequencies f1 and f2 were selected. Considering for example a pipe of 10 cm diameter (d=10 cm), a first wavelength λ1 of about 2 to 4 times the diameter, and preferably 3 times the diameter of the pipe (λ1=3d=30 cm) and a second wavelength λ2 of about 8 to 12 times the diameter, and preferably 10 times the diameter of the pipe (λ2=10d=100 cm=1 m) can be selected. In this case, the corresponding frequencies f1 and f2 are calculated such that:

$$f1 = \frac{V}{\lambda 1} = \frac{340}{0.3} = 1100 \text{ Hz and}$$

$$f2 = \frac{V}{\lambda 2} = \frac{340}{1} = 340 \text{ Hz}$$

The value of the first wavelength λ1, corresponding to about 3 times the pipe diameter, allows more spatial resolution of obstructions, especially in the case of smooth pipes such as PVC pipes. By spatial resolution, we mean that the position and distinction of individual obstructions is better identified than with other wavelengths. In addition, the value of λ1 makes it possible to identify a succession of close proximity obstructions up to a critical distance $d_{cr}$ of $$d_{cr} = \frac{n \cdot \lambda}{2}.$$

The value of the second wavelength λ2, corresponding to about 10 times the diameter of the pipe, performs better in the case of pipes with rough, cracked or irregular walls and in the case where the energy dissipated through the wall is greater, such as for pipes with concrete walls. The value of the second wavelength λ2 can also be used to detect certain deformations in the pipe, such as a bend or a cavity.

Thus, according to an embodiment, the signal emitted by the loudspeaker 100 comprises at least a first wave train at a first frequency f1. As explained above, this frequency f1 may be between 850 and 1700 Hz, and preferably correspond to about 1100 Hz, when the pipe to be inspected has a diameter of about 10 cm and comprises air. In one possible embodiment, the signal emitted by the loudspeaker 100 comprises a second wave train at a second frequency f2. This frequency f2 may be between 283 and 425 Hz, and preferably corresponds to about 340 Hz, for the pipe described above. The emitted signal comprising the two wave trains at frequencies f1 and f2 will be reflected by the various obstructions clogging the pipe, resulting in first and second reflected signals, recorded by the microphone 110. These first and second reflected signals can then be corroborated, for example by comparing them, to confirm the position of the obstructions and their degree of obstruction. By degree of obstruction, we mean the ratio of obstructed sections vs. complete section of the drain. For example, it can be, according to a cross section of the drain at a distance x from the proximal end, the ratio of the area occupied by a limestone clump to the complete area of the drain. It has been shown that the use of two wave trains at two different frequencies allows better detection of all the irregularities in the pipe, compared to when a single frequency wave train is used. This is because either of the two frequencies may be more or less sensitive to the composition of the pipe walls, the spatial distribution of obstructions, or the presence of bends in the pipe. In other embodiments, it is possible to use a signal comprising more than two wave trains, at frequencies different from the two frequencies selected above. For the detection of calcareous obstructions in dam drains, transmitting two wave trains at wavelengths of about 3 and 10 times the diameter of the drain, has been found to be advantageous in locating and determining the degree of calcareous obstructions more accurately than when a single wavelength is used, without significantly increasing system complexity or analysis time.

The number of cycles n of each emitted wave train may be determined as a compromise between i) a sufficient number of peaks to account for attenuation of the first and last peaks by the response time of the loudspeaker, and ii) a limited number of cycles to optimize detection of close proximity obstructions whose minimum critical distance $d_{cr}$ to identify two consecutive obstructions is given by $$d_{cr} = \frac{n \cdot \lambda}{2}.$$

In the described embodiment, the optimized value of the number of cycles n is equal to or greater than 3

Note that the values selected for d, λ1, λ2 and n are examples only, and other values may be selected, depending on the applications for which the system is to be used.

Figure 4A:
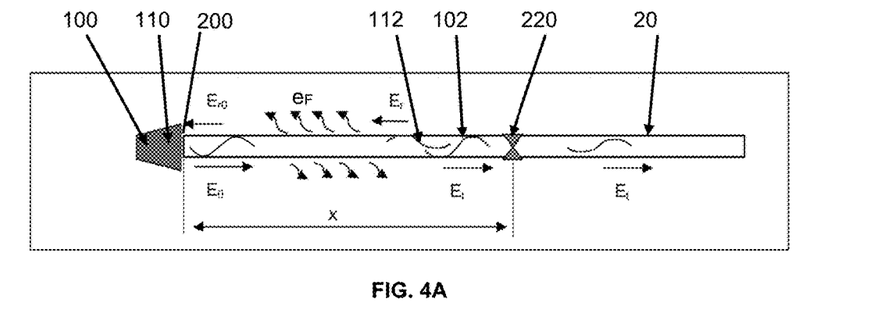
FIG. 4A is a schematic representation of wave propagation in the pipe having an obstruction.
Figure 4B:
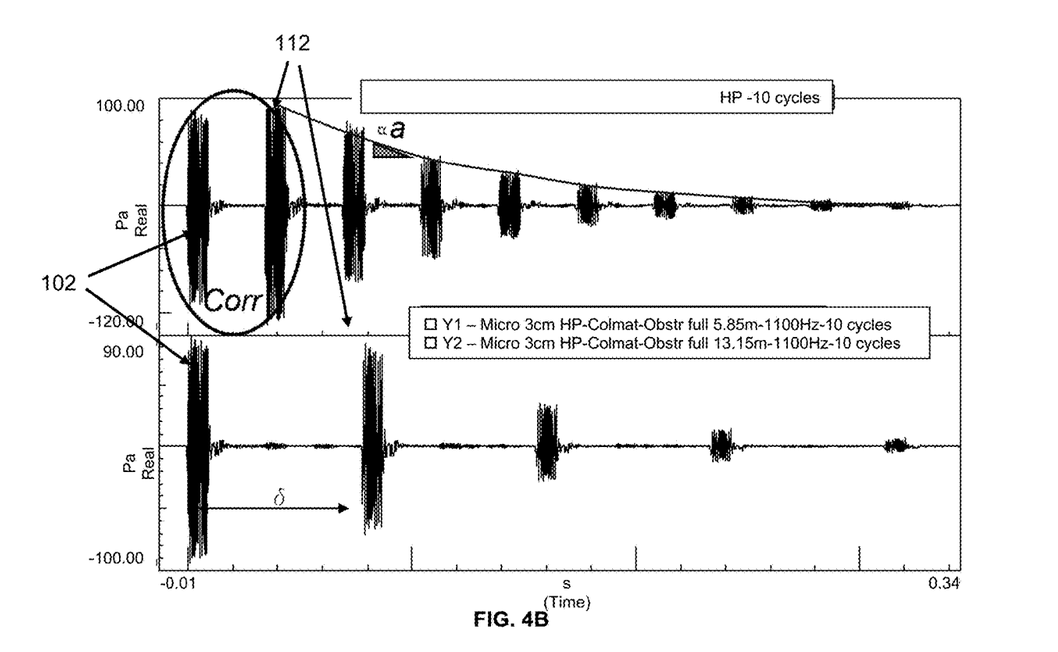
FIG. 4B is a graph representing the measurement of waves captured by the system, in one embodiment.

In the embodiment shown in FIGS. 4A and 4B, the method comprises a first step of emitting at a first (or proximal) end 200 of the pipe 20, by means of the loudspeaker 100, an emitted signal 102 comprising an acoustic wave train at the first frequency f1. At the same proximal end 200 of the pipe 20, the microphone 110 receives a reflected signal 112, resulting from the reflection of the wave train off the obstruction 220 in the pipe. The position x of the first obstruction, from the proximal end of the pipe (or the position of the microphone), is determined according to a measured delay δ between the wave train of the emitted signal 102 and the wave train of the reflected signal 112 received by the microphone. In order to consider the round trip of the wave according to the distance x traveled, x is determined by:

$$x \equiv \frac{V * \delta}{2}$$

In order to determine a degree of obstruction of the first obstruction 220 encountered by the emitted signal (the obstruction furthest upstream or closest to the proximal end of the pipe 200), the energy of the emitted and reflected signals must be extrapolated. The energy $E_y$ of the acoustic wave train of a signal is determined by the product of an effective amplitude of the acoustic wave train over n cycles in $A_{RMS}$ Pascals and the pulse duration T in seconds:

$$E_y = A_{RMS} * T$$

The subscript y denotes the signal that is being measured. With reference to FIG. 4A:

$E_0$ is the measured energy of the signal emitted at the proximal end of the pipe 200, $E_{r0}$ is the measured energy of the signal reflected from the obstruction at the proximal end of the pipe 200.

The value of this energy can also be extrapolated to the threshold of the obstruction 220:

$E_i$ is the extrapolated energy of the emitted signal at the threshold of the obstruction 220, $E_r$ is the extrapolated energy of the signal reflected by the obstruction at the threshold of the obstruction 220, $E_t$ is the extrapolated energy of the signal transmitted through the obstruction 220, in the case of a partial obstruction.

The extrapolated energy at the threshold of the obstruction can be evaluated by simulating the attenuation $\alpha$ of the wave as the acoustic pulse propagates along the pipe. The attenuation $\alpha$ is generated by friction, damping and leakage through the walls of the pipe 20. The calculation is based on the principle that the dissipated energy $e_F$ is proportional to the magnitude of its energy E by the attenuation coefficient $\alpha$.

Thus, the signal energy at a distance x from the proximal end of the pipe $E_{(x)}$ is given by:

$$E(x) = E_0 * e^{-\alpha x}$$

Figure 5:
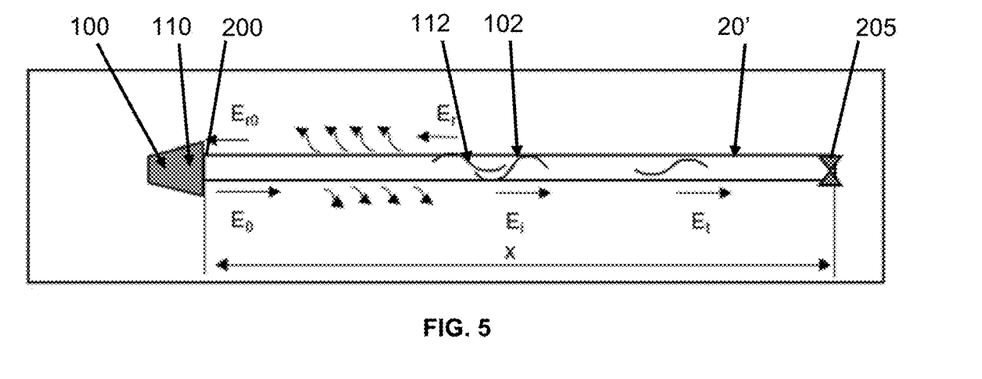
FIG. 5 is a schematic representation of wave propagation in the pipe with a complete obstruction, for calibration purposes, according to an embodiment.

In the embodiment shown in FIG. 5, in order to determine the attenuation coefficient $\alpha$, a calibration may be performed. This calibration may be performed on a calibration pipe 20' having similar properties (wall roughness, diameter, material) to the pipe to be analyzed, and that does not contain any major obstruction. The calibration pipe has a distal end 205, opposite the proximal end 200. For calibration, this distal end 205 must be completely plugged. The plugging of the distal end 205 may be accomplished by using a receptacle at the end of the tubing or any other means to force total reflection of the emitted signal. Therefore, it is reasonable to assume total reflection at the distal end 205 and consider a reflection coefficient $C_D$ equal to one ($C_D$=1). The measured attenuation between the emitted signal 102 and the reflected signal 112 consists primarily of the attenuation $\alpha$ of the wave by the walls of the pipe 20' as it travels back and forth. Once this attenuation coefficient $\alpha$ is determined, it can be used in all measurements made in pipes of similar characteristics, and at a frequency similar to the frequency used during calibration.

In one embodiment, calibration of the attenuation coefficient $\alpha$ yielded the following values:

| Material | Diameter (cm) | Frequency (Hz) | Attenuation "$\alpha$" |
|---|---|---|---|
| PVC | 7.6 | 1100 | 0.026 |
| PVC | 7.6 | 340 | 0.016 |
| Fibro-ciment | 10 | 1100 | 0.033 |
| Fibro-ciment | 10 | 340 | 0.037 |

Returning to FIGS. 4A and 4B, in the case where an obstruction is only partial, such as obstruction 220, a reflection coefficient $C_D$ and a transmission coefficient $C_T$ can be formulated for the acoustic wave propagating through obstructions.

The reflection coefficient $C_D$ can be calculated by taking the ratio of the extrapolated energy of the signal reflected by the obstruction at the obstruction threshold $E_r$ to the extrapolated energy of the transmitted signal at the obstruction threshold Ei:

$$C_D = \frac{E_r}{E_i}$$

The transmission coefficient $C_T$ can be calculated as the ratio of the extrapolated energy of the signal transmitted through the obstruction $E_t$ to the extrapolated energy of the signal emitted at the obstruction threshold Ei:

$$C_T = \frac{E_t}{E_i}$$

This transmission coefficient $C_T$ is used to extrapolate the incident and reflected waves to the next obstruction. The following formula can be used to determine $C_T$ as a function of $C_D$:

$$C_T = (1 - C_D^{Ctrans})$$

Where $C_{trans}$ is a coefficient of transmissibility obtained by a convergence algorithm based on data from laboratory tests (calibration). The value of $C_{trans}$ is between 1 and 6, depending on the type of detected element. By detected element, we mean an element among close proximity obstructions, distinct obstructions, a bend in the pipe, or a cavity or a widening and/or narrowing of the pipe section.

This transmissibility coefficient $C_{trans}$ is determined by a calibration carried out during various laboratory tests, with obstructions positioned at known distances, on a calibration pipe having similar properties (wall roughness, diameter, material) to those of the pipe to be inspected. The different values of $C_{trans}$ will be detailed in the following description.

Thus, when an obstruction has been identified, i.e. its position has been determined by the measured delay between the emitted signal wave train and the reflected signal wave train, its degree of obstruction can be determined. This degree of obstruction can be identified by a ratio a/A, where a represents the obstructed area and A represents the complete cross-sectional area of the pipe. This degree of obstruction is therefore a number between 0 and 1, where 0 represents no obstruction in the pipe and 1 represents total obstruction of the pipe.

The degree of obstruction a/A can be determined from a function of the reflection coefficient $C_D$. This function can be a polynomial function or any other function that relates the value of a/A to that of $C_D$. For the most upstream obstruction in the pipe, i.e., the obstruction closest to the proximal end, the ratio a/A can be determined by a function of the reflection coefficient $C_D$. For subsequent obstructions, their respective degree of obstruction is determined by repeating the steps described below, i.e., a) extrapolating emitted signal energy and a reflected signal energy at the position of the obstruction; b) calculating the degree of reflection $C_D$, but replacing the extrapolated emitted signal energy $E_i$ with the transmitted energy $E_t$ once the upstream obstruction is passed, as described above; and finally c) calculating the ratio a/A is determined by a function of the reflection coefficient $C_D$.

According to one possible embodiment, where the pipe is an air-filled barrier drain, this function is a 1st degree polynomial function, or linear function, expressed by:

$$a/A = P_1 \times C_D + P_2, \text{ where}$$

$P_1$ is a first constant between 0.1 and 2; and
$P_2$ is a second constant between −1 and 1.

The values of $P_1$ and $P_2$ depend mainly on the frequency of the emitted signal. The various tests carried out show that these constants are not very sensitive to the diameter of the pipe or the surface conditions, since these parameters are already taken into account in the determination of the reflection coefficient $C_D$.

Thus, according to this embodiment, $P_1=1$ and $P_2=0$, so that the degree of obstruction a/A corresponds to the reflection coefficient $C_D$.

Figure 6:
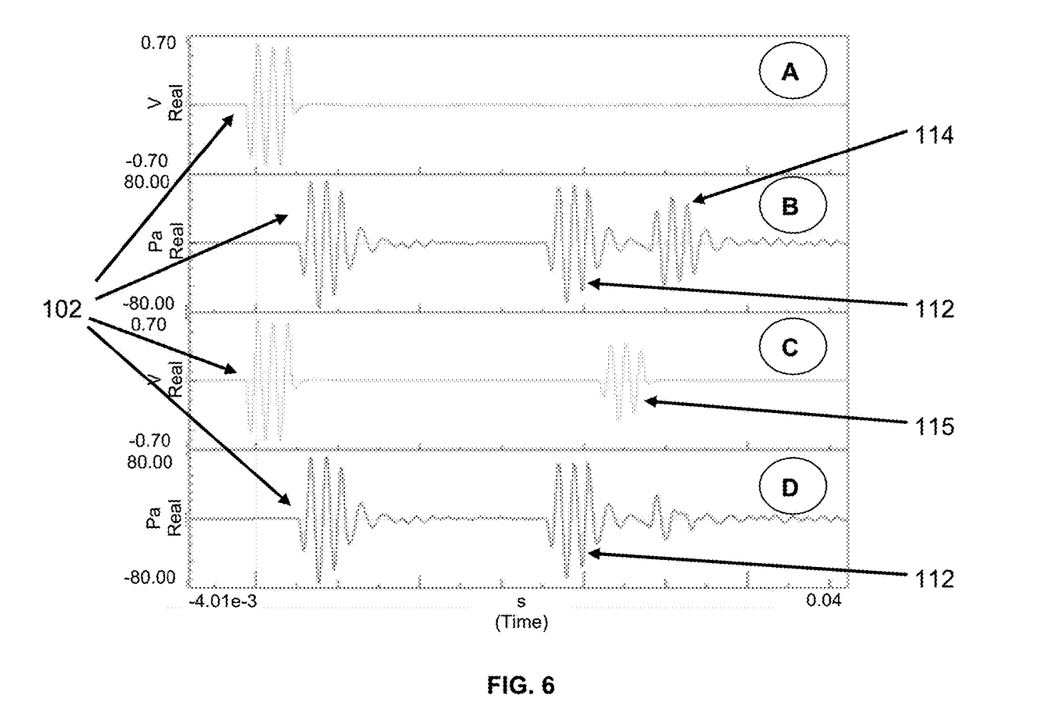
FIG. 6 is a graph showing a possible attenuation of the wave reflection phenomenon on the portable system, in an embodiment.

In some cases, as shown in FIG. 6, a wave train superposition effect may be observed. The four graphs A through D shown in FIG. 6 show the emitted signal 102 from the loudspeaker (graphs 6-A and 6-C) comprising a wave train at frequency f1 and where n=3 cycles, as well as the reflected signal 112 received by the microphone (graphs 6-B and 6-C). Note that the emitted signal 102 from the loudspeaker is also measured as it passes through the microphone, as shown in FIGS. 6-B and 6-C, with a delay relative to the emitted signal from the microphone corresponding to the distance between the loudspeaker and the microphone. In effect, when the reflected signal 112 returns to the microphone, it is recorded by the microphone, but the reflected signal 112 continues its propagation past the microphone until it reaches the loudspeaker, located upstream of the microphone. This reflected signal 112 can then bounce off the loudspeaker and back to the obstruction, again being recorded by the microphone as a spurious reflected signal 114. This back and forth can continue until the wave is damped. These multiple reflections can mask real reflections from more distant obstructions. Therefore, it is best to prevent these bounces.

One way of suppressing this spurious reflected signal 114 is to emit a wave train equal to but in phase opposition to the spurious reflected signal through the loudspeaker, the so-called cancellation wave train 115. Among other things, a delay may be applied before emitting this wave train, in order to reflect the distance between the microphone and the loudspeaker. Thus, when the reflection bounces off the loudspeaker, the loudspeaker reacts with a mirror wave of this reflection in opposite phase so that the spurious reflected signal is cancelled, as shown in FIG. 6-D.

Figure 7:
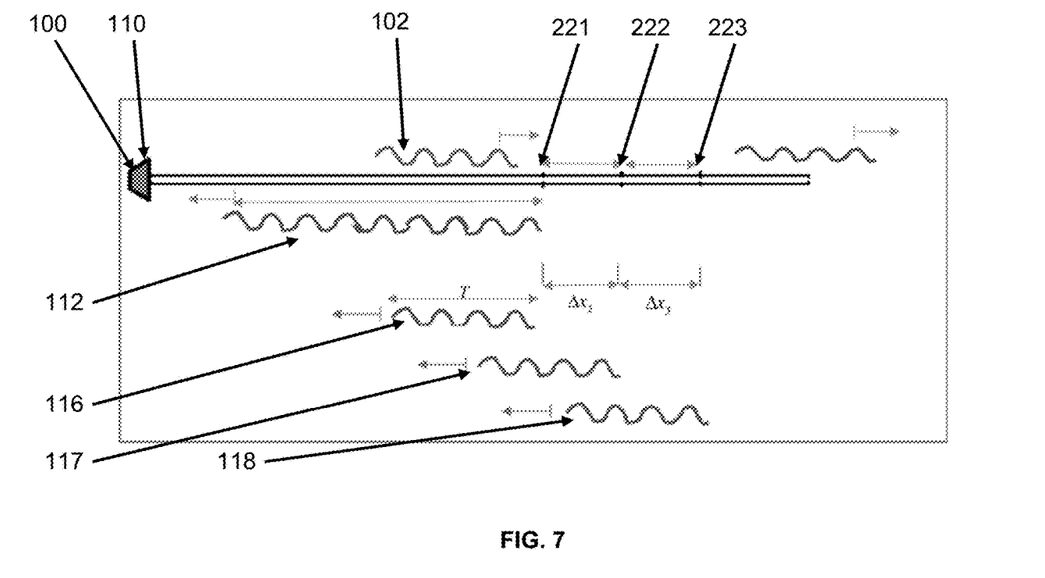
FIG. 7 is a schematic representation of the phenomenon of acoustic wave chaining on close proximity obstructions in the pipe, according to an embodiment.

As shown in FIG. 7, a phenomenon of chained reflections from multiple close proximity obstructions can be detected when the reflected signal 112 has a number of reflected cycles $n_r$ greater than the number of emitted cycles n from the loudspeaker 100. This phenomenon is characterized by an overlapping effect of multiple reflections. This overlap is described as follows: the wave incident on the first obstruction 221 is partly reflected; its transmitted part (for a partial obstruction) is partly reflected on the second obstruction 222 close to the previous one, this one being located sufficiently close to the first obstruction 221 so that the first reflected signal 116 does not have time to release all its cycles from the first obstruction 221 causing the second reflected signal 117 coming from the reflection on the second obstruction 222 to overlap part of the cycles of the first reflected signal 116. Similarly, a third reflected signal 118 from the reflection on the third obstruction 223 overlaps a portion of the cycles of the second reflected signal 117.

The phenomenon is caused by the approach of obstructions whose critical distance $d_{cr}$ between two consecutive obstructions is too short compared to the number of cycles n emitted, times the wavelength λ of the emitted signal.

Knowing that $$d_{cr} = \frac{n \cdot \lambda}{2},$$

the criterion of chained reflections occurs when a distance $D_x$ that separates two consecutive obstructions is smaller than $d_{cr}$. We talk about close proximity obstructions.

For example, for an emitted signal with wavelength λ=340 Hz and a number of cycles n=3, chained reflections will occur if consecutive obstructions are less than 1.5 m apart.

The calculation of the number of close proximity obstructions m in an area of chained reflections can be established from a total number of cycles of the reflected signal $n_r$ and the number of cycles of the emitted signal n, such that m is the rounded-up integer of the ratio ($n_r$/n), with $n_r$>n.

In one embodiment and as illustrated in FIG. 7, $C_{trans}=1$ for all close proximity obstructions, except for the last obstruction before the end of the pipe for which $C_{trans}=2.55$.

On the contrary, if the distance $D_x$ between two consecutive obstructions is greater than $d_{cr}$, the obstructions are said to be distinct.

Figure 8:
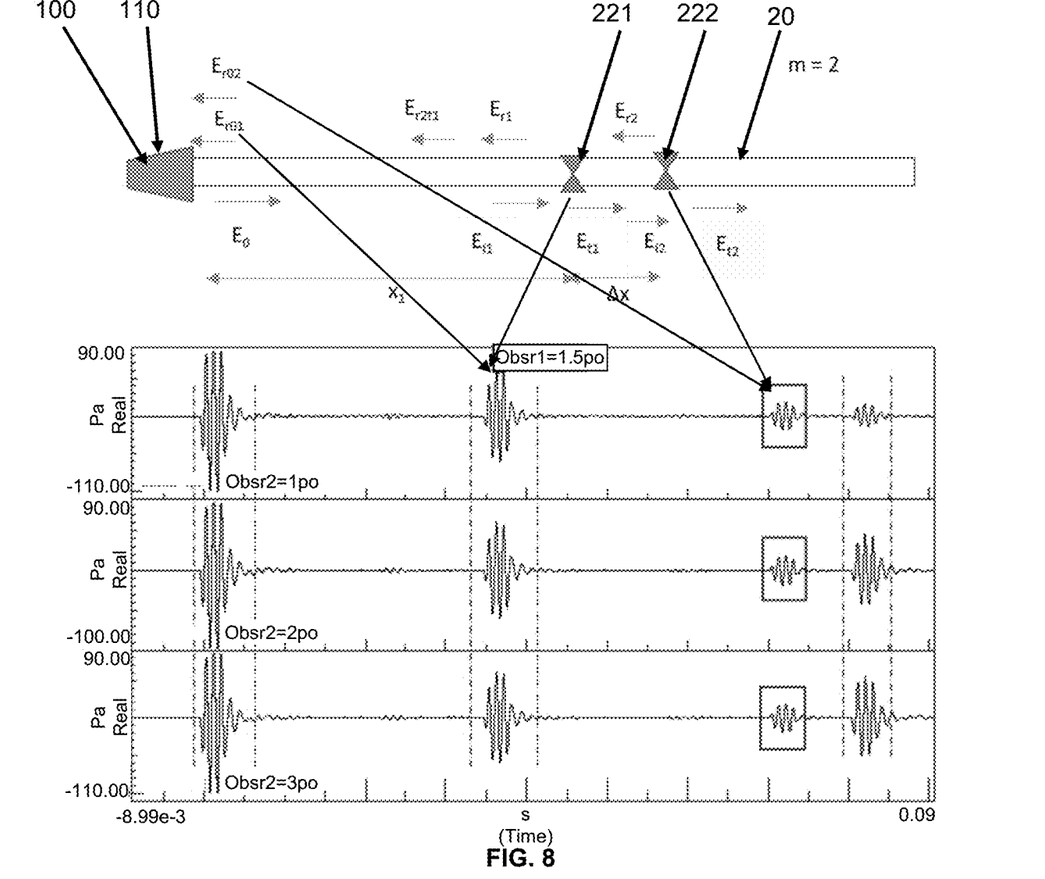
FIG. 8 is a schematic representation of wave propagation in the pipe having two distinct partial obstructions, as well as a graph representing the measurement of the waves captured by the portable system, according to an embodiment.

FIG. 8 illustrates an embodiment including two distinct obstructions (m=2). In one embodiment and as shown in FIG. 8, $C_{trans}=2.55$ for a separate obstruction.

Thus, in order to be able to determine the degree of obstruction a/A of several distinct consecutive obstructions, it is preferable to determine the transmissibility coefficient $C_{trans}$ for each obstruction. To do this, it is possible to start sequentially from the first obstruction. Then, the reflection coefficient $C_D$ and transmission coefficient $C_T$ can be calculated for each previous obstruction so that the incident and reflected energies can be extrapolated to the next obstruction. This procedure can be applied to all $m^{th}$ obstructions identified, as follows:

$$C_{Dm} = \frac{E_{rm}}{E_{im}} = \frac{E_{r0}}{E_0} \cdot e^{+2 \cdot \alpha \cdot x} \cdot \left\{ \prod_{k=2}^{m-1} e^{-2 \cdot \alpha \cdot \Delta_k} \cdot \left[1 - C_{D(k-1)}^{C_{trans}}\right]^2 \right\}^{-1}$$

where:
$C_{Dm}$ is the reflection coefficient of the $m^{th}$ obstruction,
$E_{rm}$ is the extrapolated energy of the signal reflected by the $m^{th}$ obstruction at the threshold of the $m^{th}$ obstruction, $E_{im}$ is the extrapolated energy of the emitted signal at the threshold of the $m^{th}$ obstruction, $E_{r0}$ is the measured energy of the signal reflected by the $m^{th}$ obstruction at the proximal end of the pipe, x is the distance from the proximal end of the pipe to the first obstruction, α is the attenuation coefficient of the pipe, $\Delta x_k$ is the distance between two consecutive obstructions, and $C_{trans}$ is the transmissibility coefficient.

For example, in the case illustrated in FIG. 8, where m=2:

$$C_{D1}=E_{i1}/E_{r1} \text{ and } C_{D2}=E_{i2}/E_{r2}.$$

Figure 9:
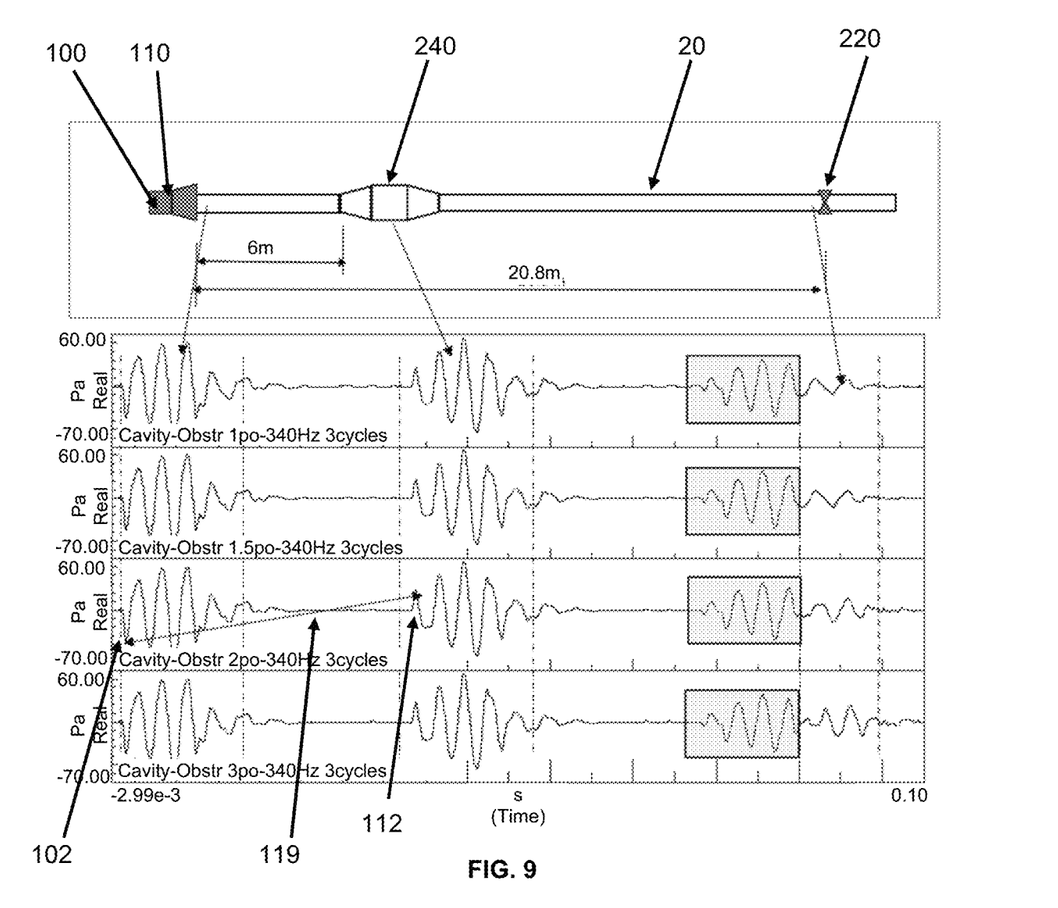
FIG. 9 is a schematic representation of wave propagation in the pipe having a cavity, as well as a graph representing the measurement of waves captured by the portable system, according to an embodiment.

In some cases, as shown in FIG. 9, the pipe 20 may have a cavity 240 or bulge. The characteristic of a cavity 240 along the pipe 20 is a volume whose diameter is more than 1.5 times the diameter of the pipe in width and is limited in distance generally to a length less than 1 wavelength λ of the emitted signal and through which the pipe continues. This cavity may be the result of erosion of the pipe over time, for example.

When the emitted signal encounters a cavity 240, the reflected signal received by the loudspeaker 100 exhibits a 180-degree phase change. This antiphase 119 is illustrated in FIG. 9, where it can be seen that the emitted signal 102 from the loudspeaker begins with a value of overpressure relative to atmospheric (downward cycle), while the reflected signal 112 has a value of underpressure relative to atmospheric (upward cycle). This antiphase is characteristic of a cavity 240 and should therefore not be interpreted as an obstruction in the pipe.

In one embodiment and as illustrated in FIG. 9, $C_{trans}=6$ for a cavity. This value can be obtained by a convergence algorithm based on data from laboratory tests.

Figure 10:
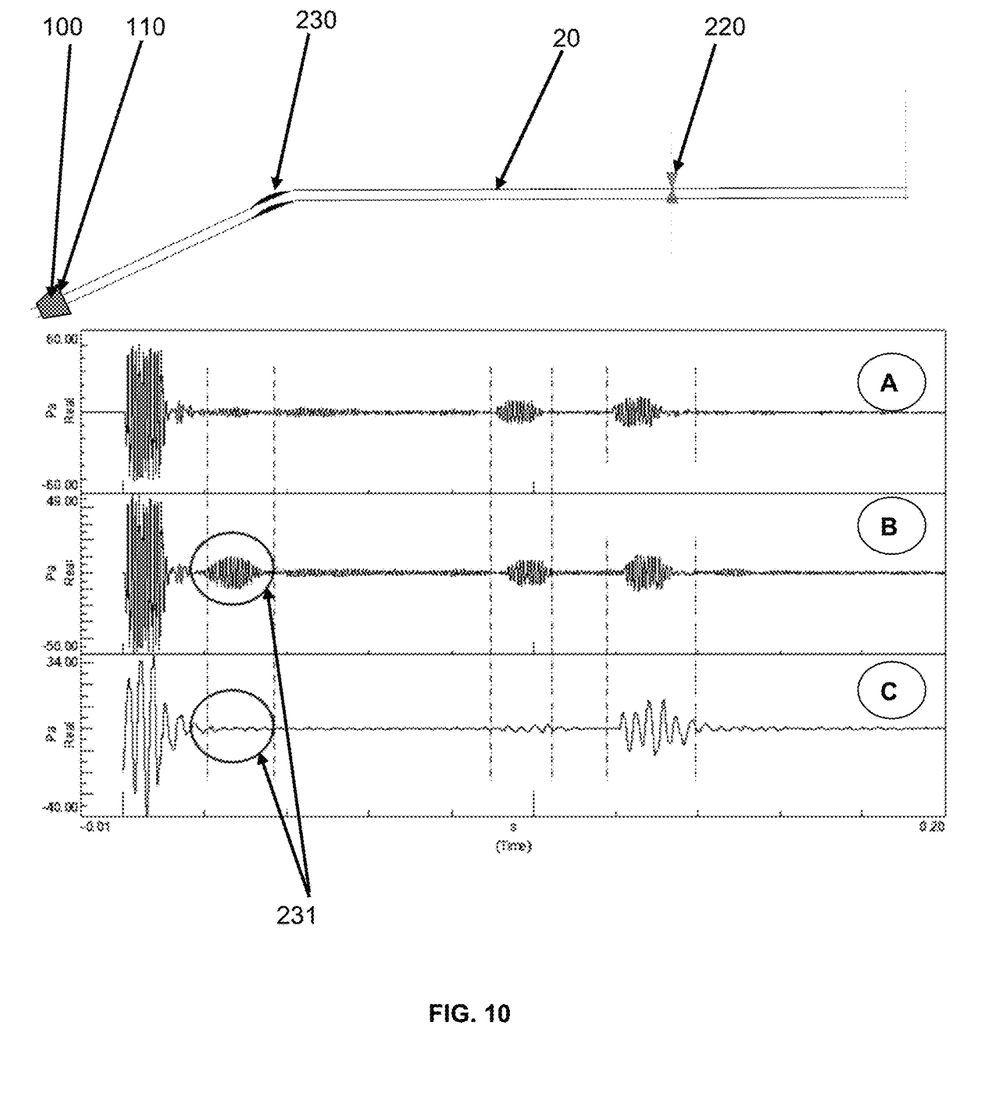
FIG. 10 is a schematic representation of wave propagation in the pipe having a bend, as well as a graph representing the measurement of waves captured by the portable system, according to one embodiment.

In other embodiments, as shown in FIG. 10, the pipe 20 may have a bend 230. Bends in pipes are typically small in magnitude, on the order of about 30 degrees, for example.

The three graphs shown in FIG. 10 show respectively:

a signal measured by the microphone of an acoustic wave emitted at a frequency $f_1$=1100 Hz and n=10 cycles, without any bend in the pipe, but with a 3 cm obstruction placed at 15.6 m from the source (graph 10-A)

a signal measured by the microphone of an acoustic wave emitted at a frequency $f_1$=1100 Hz and n=10 cycles, the pipe having a 30-degree bend at a distance of 3.6 m from the proximal end of the pipe, as well as a 3 cm thick obstruction in the form of a deposit at 15.6 m from the proximal end of the pipe (graph 10-B), and a signal measured by the microphone of an acoustic wave emitted at a frequency $f_2$=340 Hz and n=3 cycles, with a 30-degree bend in the pipe at a distance of 3.6 m from the proximal end of the pipe, as well as a 3-cm-thick obstruction in the form of a deposit 15.6 m from the proximal end of the pipe (FIG. 10-C).

It should be noted that graphs 10-B and 10-C show a disparity 231. Indeed, the acoustic wave of the signal emitted at the frequency $f_1$=1100 Hz (graph 10-B) detects the bend 230 while the acoustic wave of the signal emitted at the frequency $f_2$=340 Hz (graph 10-C) does not detect the bend.

Thus, a bend 230 in a pipe may be identified by corroborating the reflected signal from the first wave train emitted at a frequency $f_1$ with the reflected signal from the second wave train emitted at a frequency $f_2$. For example, this corroboration could involve superimposing the reflected signals from the first and second wave trains emitted at respective frequencies of $f_1$ and $f_2$ in order to identify the mismatch 231, since the reflected signal from the first wave train shows a series of pulses, while the reflected signal from the second wave train shows no significant pulses.

In one embodiment, the computer processor 130 may automate all of the steps of the above method. An algorithm developed as part of signal processing and obstruction prediction software can identify and characterize the reflection, identifying in the signal measured by the microphone:

A beginning and an end of a pulse of the emitted and reflected signal,

The position of the first obstruction x,

An effective amplitude $A_{RMS}$, and

A duration of the pulse T.

Once these characteristics are identified, the software can identify each reflected signal according to 4 categories for a signal emitted at a frequency $f_2$:

1. Distinct obstructions if the number of cycles of the reflected signal is less than or equal to the number of cycles of the emitted signal,
2. Close proximity and chained obstructions if the number of cycles of the reflected signal is higher or equal to the number of cycles of the emitted signal+1 cycle,
3. Cavities, or
4. Pipe outlet.

In a subsequent step, the software may also allow the degree of obstruction and the coefficient of transmissibility of each obstruction to be determined.

Although certain advantages have been described, the person skilled in the art may discover other advantages and/or features inherent in the invention that have not been explicitly described. Furthermore, although certain configurations and embodiments have been described herein, it is appreciated that they are by way of example only and should not be taken to limit the scope of the invention.

The invention claimed is:

1. A method for locating and quantifying obstructions in a pipe, the method comprising:

emitting, at an end of the pipe, through a loudspeaker, an emitted signal comprising a wave train, the waves being of an acoustic type;

receiving at the same end of the pipe, through a microphone, a reflected signal resulting from a reflection of the wave train on the obstructions in the pipe;

determining a position of each of the obstructions based on a time delay measured between the wave train of the emitted signal and the wave train of the reflected signal received by the microphone;

determining, for a most upstream obstruction, its degree of obstruction by performing the steps of:

a) extrapolating an energy of the emitted signal and an energy of the reflected signal at the position of the obstruction;

b) calculating a reflection coefficient $C_D=E_r/E_i$, where $E_i$ is the extrapolated emitted signal energy and $E_r$ is the extrapolated reflected signal energy;

c) calculating a ratio a/A of a partly obstructed section and a complete section of the pipe, the ratio a/A being determined by a function of the reflection coefficient $C_D$; and determining, for subsequent obstructions, their respective degrees of obstruction by repeating steps a) through c) for each one, and by replacing the extrapolated emitted signal energy $E_i$ with a transmitted energy $E_t$ once the upstream obstruction has been passed.

2. The method according to claim 1, wherein the step of emitting the emitted signal comprises a step of forming the wave train with a number n of cycles, where n≥3.

3. The method according to claim 1, comprising:
   determining a number of close proximity obstructions m by estimating, from the reflected signal, a number of overlapped cycles $n_t$ greater than the number of emitted cycles n in the wave train, such that m is a rounded-up integer of a ratio ($n_t$/n).

4. The method according to claim 1, wherein the wave train is a first wave train emitted at a first frequency, the first frequency corresponding approximately to a first wavelength of 3 times a diameter of the pipe.

5. The method according to claim 4, wherein the emitted signal comprises a second wave train at a second frequency corresponding approximately to a second wavelength of 10 times the diameter of the pipe, the first and second wave trains permitting to detect different types of obstructions;
   wherein the method further comprises a step of corroborating the respective positions of the obstructions and their degrees of obstruction using the results obtained with the first and second wave trains.

6. The method according claim 1, wherein the reflected signal comprises a first signal reflected from the obstructions of the pipe, downstream of the microphone, and a second signal reflected from the loudspeaker, upstream of the microphone, the method comprising:
   eliminating the second signal reflected by emitting through the loudspeaker, a wave train equal to but in opposite phase with the second signal reflected from the loudspeaker.

7. The method according to claim 1, wherein the function that determines the ratio a/A with respect to the reflection coefficient $C_D$ is given by a/A=$P_1 \times C_D + P_2$, $P_1$ being a first constant between 0.1 and 2 and $P_2$ being a second constant between −1 and 1, according to the frequency used.

8. The method according to claim 7, wherein $P_1$ is equal to 1 and $P_2$ is equal to 0.

9. The method according to claim 1, wherein the transmitted energy $E_t$ corresponds to the extrapolated emitted signal energy $E_i$ multiplied by $[1-C_D^{C_{trans}}]$, where $C_{trans}$ is a transmissibility coefficient having a value between 1 and 6, based on a detected element.

10. The method according to claim 9, wherein the value of $C_{trans}$ is equal to 2.55 when the detected element is a distinct obstruction.

11. The method according to claim 9, wherein the value of $C_{trans}$ is equal to 1 when the detected element is a close proximity obstruction.

12. The method according to claim 9, wherein the value of $C_{trans}$ is equal to 6 when the detected element is a cavity.

13. The method according to claim 1, wherein the step of extrapolating comprises a step of applying an attenuation factor on the emitted and reflected signals, based on a distance of a given obstruction from the end of the pipe.

14. The method according to claim 13, comprising a step of simulating a complete blockage of the pipe at a predetermined distance from the end of the pipe, to determine the attenuation factor to be applied in the step of extrapolating the emitted signal and the reflected signal to the position of the obstructions.

15. The method according to claim 1, comprising:
   detecting a cavity in the pipe by identifying, in the reflected signal, a wave train in anti-phase relative to the wave train of the emitted signal.

16. The method according to claim 5, comprising:
   identifying a bend in the pipe when the microphone receives the reflected signal of the first wave train but does not receive the reflected signal of the second wave train.

17. A portable system for locating and quantifying obstructions in a pipe, the system comprising:
   a loudspeaker, configured to emit at an end of the pipe an emitted signal comprising a wave train, the waves being of an acoustic type;
   a microphone, configured to receive, at the same end of the pipe, a reflected signal, resulting from a reflection of the wave train on the obstructions in the pipe;
   a processor and a memory in communication with the processor, the processor and the memory being operatively connected to the microphone and loudspeaker, the memory comprising instructions executable by the processor to:
   determine a position of each of the obstructions based on a measured time delay between the emitted signal wave train and the reflected signal wave train received by the microphone; and
   determine, for a most upstream obstruction, its degree of obstruction by performing the steps of:
     a) extrapolating an emitted signal energy and a reflected signal energy at the position of the obstruction;
     b) calculating a reflection coefficient $C_D=E_r/E_i$, where $E_i$ is the extrapolated emitted signal energy and $E_r$ is the extrapolated reflected signal energy; and
     c) calculating a ratio a/A between a partly obstructed section and a complete section of the pipe, the ratio a/A being determined by a function of the reflection coefficient Co;
   wherein the processor determines, for subsequent obstructions, their respective degree of obstruction by repeating steps a) to c) for each one and by replacing the extrapolated emitted signal energy $E_i$ with a transmitted energy $E_t$ once the upstream obstruction has been passed.

18. The system according to claim 17, wherein the loudspeaker and the microphone are disposed in a housing, and wherein the processor and the memory are offset from the housing.

19. The system, according to claim 18, wherein the housing is positioned at the end of the pipe, with the loudspeaker and microphone aligned on a central axis of the pipe.

20. The system, according to claim 17, wherein the loudspeaker is located approximately 3 cm upstream of the microphone relative to the end of the pipe.

* * * * *